(12) United States Patent
Wu et al.

(10) Patent No.: US 12,200,537 B2
(45) Date of Patent: Jan. 14, 2025

(54) METHOD AND APPARATUS FOR HOP-BY-HOP FLOW CONTROL

(71) Applicant: Lenovo (Beijing) Ltd., Beijing (CN)

(72) Inventors: Lianhai Wu, Chaoyang (CN); Joachim Löhr, Wiesbaden (DE); Prateek Basu Mallick, Dreieich (DE); Jie Shi, Haidian District (CN); Haiming Wang, Xicheng District (CN); Jing Han, Chaoyang District (CN)

(73) Assignee: Lenovo (Beijing) Ltd., Beijing (CN)

( * ) Notice: Subject to any disclaimer, the term of this patent is extended or adjusted under 35 U.S.C. 154(b) by 383 days.

(21) Appl. No.: 17/767,759

(22) PCT Filed: Oct. 10, 2019

(86) PCT No.: PCT/CN2019/110340
§ 371 (c)(1),
(2) Date: Apr. 8, 2022

(87) PCT Pub. No.: WO2021/068158
PCT Pub. Date: Apr. 15, 2021

(65) Prior Publication Data
US 2023/0106809 A1    Apr. 6, 2023

(51) Int. Cl.
*H04W 28/02*    (2009.01)
(52) U.S. Cl.
CPC ... *H04W 28/0273* (2013.01); *H04W 28/0284* (2013.01); *H04W 28/0289* (2013.01)
(58) Field of Classification Search
None
See application file for complete search history.

(56) References Cited

U.S. PATENT DOCUMENTS

| | | | |
|---|---|---|---|
| 10,291,541 B1* | 5/2019 | Sung | H04L 47/32 |
| 2020/0045610 A1* | 2/2020 | Shih | H04L 45/28 |
| 2020/0351700 A1* | 11/2020 | Han | H04W 80/02 |

(Continued)

FOREIGN PATENT DOCUMENTS

| CN | 107736004 A | 2/2018 |
|---|---|---|
| CN | 110248376 A | 9/2019 |

(Continued)

OTHER PUBLICATIONS

"International Preliminary Report on Patentability", PCT Application No. PCT/CN2019/110340, Apr. 21, 2022, 5 pages.

(Continued)

*Primary Examiner* — Hassan A Phillips
*Assistant Examiner* — Gautam Sharma
(74) *Attorney, Agent, or Firm* — FIG. 1 Patents (57) ABSTRACT

The present disclosure relates to methods and apparatuses. According to some embodiments of the disclosure, a method performed by a communication device, includes: receiving, from a base station, a first configuration information indicating a threshold to configure the communication device, wherein the threshold is associated with data volume; determining whether congestion happens at the communication device based on the threshold; and transmitting a congestion indication to a first parent node via a Backhaul Adaptation Protocol (BAP) signaling message when it is determined that the congestion happens at the communication device.

20 Claims, 7 Drawing Sheets

(56) References Cited

U.S. PATENT DOCUMENTS

| | | | |
|---|---|---|---|
| 2021/0377846 A1* | 12/2021 | Zhu | H04W 48/16 |
| 2022/0167382 A1* | 5/2022 | Zhuo | H04W 72/1263 |
| 2022/0183105 A1* | 6/2022 | Muhammad | H04W 84/047 |
| 2022/0232414 A1 | 7/2022 | Wu et al. | |
| 2023/0106809 A1* | 4/2023 | Wu | H04W 28/0289 370/229 |
| 2023/0115685 A1* | 4/2023 | Hwang | H04W 8/26 709/245 |
| 2024/0163709 A1* | 5/2024 | Mildh | H04W 76/12 |

FOREIGN PATENT DOCUMENTS

| | | |
|---|---|---|
| EP | 3966965 A1 | 3/2022 |
| WO | 2019190650 A1 | 10/2019 |

OTHER PUBLICATIONS

"International Search Report and Written Opinion", PCT Application No. PCT/CN2019/110340, Jun. 24, 2020, 6 pages.

Huawei , et al., "Flow control for IAB networks", 3GPP TSG-RAN WG2 Meeting #107bis, R2-1912367, Chongqing, China [retrieved May 25, 2022]. Retrieved from the Internet <https://www.3gpp.org/DynaReport/TDocExMtg-R2-107-32834.htm>., Oct. 2019, 3 pages.

LG Electronics Inc. , et al., "Further details for DL flow control", 3GPP TSG-RAN WG2 Meeting #107bis, R2-1913819, Chongqing, China, Oct. 2019, 2 pages.

Samsung , "DL End-to-end flow control in IAB network", 3GPP TSG-RAN WG3 Meeting #105bis, R2-194996, was R2-193981/R3-194996 [retrieved May 25, 2022]. Retrieved from the Internet <https://www.3gpp.org/DynaReport/TDocExMtg-R3-105-32842.htm>., Oct. 2019, 3 pages.

19948471.8 , "Extended European Search Report", EP Application No. 19948471.8, May 23, 2023, 13 pages.

CATT , "Discussion on BAP Buffer", 3GPP TSG-RAN WG2 Meeting #107bis, R2-1912123, Chongqing, P. R. China [retrieved Jun. 6, 2023]. Retrieved from the Internet <https://www.3gpp.org/ftp/tsg_ran/WG2_RL2/TSGR2_107bis/Docs>., Oct. 2019, 3 Pages.

Huawei , et al., "Remaining issues on flow control", 3GPP TSG-RAN WG2 meeting #107, R2-1911213, Prague, Czech Republic [retrieved Jun. 6, 2023]. Retrieved from the Internet <https://www.3gpp.org/ftp/tsg_ran/WG2_RL2/TSGR2_107/Docs>., Aug. 2019, 3 Pages.

LG Electronics Inc. , "Flow control in IAB node", 3GPP TSG-RAN WG2 NR Ad Hoc #4, R2-1810432, Montreal, Canada [retrieved Jun. 6, 2023]. Retrieved from the Internet <https://www.3gpp.org/ftp/tsg_ran/wg2_rl2/TSGR2_AHs/2018_07_NR/Docs>., Jul. 2018, 2 Pages.

* cited by examiner

METHOD AND APPARATUS FOR HOP-BY-HOP FLOW CONTROL

TECHNICAL FIELD

The present disclosure generally relates to wireless communication technology, and more particularly to hop-by-hop flow control in a wireless communication system.

BACKGROUND

In the 3rd Generation Partnership Project (3GPP), deployment of Relay Nodes (RNs) in a wireless communication system is promoted. One objective of deploying RNs is to enhance coverage area of a Base Station (BS, also called gNB in 5G networks) by improving the throughput of a mobile device (also known as a User Equipment (UE)) that is located in a coverage hole or far from the BS, which can result in relatively low signal quality.

In a wireless communication system which employs RNs, a BS that can provide connection to at least one RN is called a donor BS (or a donor node or a donor). An RN is connected to a donor BS by a backhaul link. The RN may hop through one or more RNs before reaching the donor BS, or may be directly connected to the donor BS. For the New Radio (NR) communication networks, 3GPP is envisioning an Integrated Access and Backhaul (IAB) architecture for supporting multi-hop relays, wherein a donor node with multi-connectivity is also supported by an IAB node. That is, the IAB node may have a plurality of active routes to the donor BS via multiple parent IAB nodes. A multi-hop network may provide more range extension than a single-hop network. This is relatively more beneficial with respect to wireless communications at frequencies above 6 GHz, which have limited ranges when using single-hop backhauling. Multi-hop backhauling further enables backhauling around obstacles, e.g., buildings in an urban environment for in-cluster deployments.

In a wireless communication system, congestion or overload may occur at an intermediate IAB node, which can be accessed by a child node (e.g., an accessing IAB node or a UE). The intermediate IAB node may have more than one parent node or more than one child node. These factors may increase difficulties in flow control. Thus, improved methods for flow control are required for a wireless communication system to support multi-hop backhauling and multi-connectivity.

SUMMARY OF THE DISCLOSURE

An embodiment of the present disclosure provides a method of a communication device. The method may include receiving, from a base station, a first configuration information indicating a threshold to configure the communication device, wherein the threshold is associated with data volume; determining whether congestion happens at the communication device based on the threshold; and transmitting a congestion indication to a first parent node via a Backhaul Adaptation Protocol (BAP) signaling message when it is determined that the congestion happens at the communication device.

In an embodiment of the present application, receiving the first configuration information may include receiving the first configuration information at a Mobile Termination (MT) of the communication device via a Radio Resource Control (RRC) signaling message. In another embodiment of the present application, receiving the first configuration information may include receiving the first configuration information at a Distributed Unit (DU) of the communication device via an F1 signaling message.

In an embodiment of the present application, the congestion may happen at a first ingress RLC channel between the first parent node and the communication device. Determining whether the congestion happens at the communication device based on the threshold may include: determining a first data volume of a Radio Link Control (RLC) entity associated with the first ingress RLC channel and a second data volume of a BAP entity associated with the first ingress RLC channel at a Distributed Unit (DU) of the communication device; and determining that the congestion happens at the communication device when a sum of the first data volume and the second data volume is equal to or greater than the threshold. Determining the first data volume may include determining the first data volume based on a size of at least one of the following: RLC Service Data Units (SDUs) that do not included in a RLC data Protocol Data Unit (PDU); RLC SDU segments that do not included in a RLC data PDU; RLC data PDUs that are pending for initial transmission; and RLC data PDUs that are pending for retransmission. Determining the second data volume may include determining the second data volume based on a size of at least one of the following: BAP Service Data Units (SDUs) for which BAP Data Protocol Data Units (PDUs) have not been constructed; BAP Data PDUs that have not been submitted to a lower layer; and BAP Control PDUs that have not been submitted to a lower layer.

In an embodiment of the present application, a Distributed Unit (DU) of the communication device may determine whether the congestion happens or not. The method may further include informing, by the DU of the communication device, a Mobile Termination (MT) of the communication device the happening of the congestion when the DU of the communication device determines that the congestion happens at the communication device. The method may further include generating, by the MT of the communication device, a BAP control element including the congestion indication. Transmitting the congestion indication to the first parent node may include transmitting, by the MT of the communication device, the BAP control element to the first parent node.

In an embodiment of the present application, the first parent node may be the only parent node of the communication device. In another embodiment of the present application, the communication device may have a plurality of parent nodes, and the first parent node is one of the plurality of parent nodes.

In an embodiment of the present application, the method may further include receiving, from a base station, a second configuration information indicating association of each of a plurality of ingress RLC channels between the plurality of parent nodes and the communication device with one of the plurality of parent nodes, wherein the second configuration information indicates that the first ingress RLC channel of the plurality of ingress RLC channels is associated with the first parent node.

In another embodiment of the present application, the method may further include receiving, from a base station, a third configuration information indicating association of ingress RLC channels between the communication device and a plurality of parent nodes of the communication device with the plurality of parent nodes, wherein each ingress RLC channel is configured to be associated with two or more parent nodes of the plurality of parent nodes, wherein the third configuration information indicates that the first ingress RLC channel is associated with the first parent node and at least one second parent node of the plurality of parent nodes. The method may further include transmitting the congestion indication to the at least one second parent node via a BAP signaling message when it is determined that the congestion happens at the communication device.

Another embodiment of the present disclosure provides a method of a base station. The method may include transmitting, to a communication device, a first configuration information indicating a threshold for congestion indication to configure the communication device, wherein the threshold is associated with a data volume.

In an embodiment of the present application, the first configuration information may be transmitted to a Mobile Termination (MT) of the communication device via a Radio Resource Control (RRC) signaling message. In another embodiment of the present application, the first configuration information may be transmitted to a Distributed Unit (DU) of the communication device via an F1 signaling message.

In an embodiment of the present application, the method may further include transmitting, to the communication device, a second configuration information indicating association of ingress RLC channels between the communication device and a plurality of parent nodes of the communication device with the plurality of parent nodes, wherein each ingress RLC channel is configured to be associated with two or more parent nodes of the plurality of parent nodes; and transmitting duplicated downlink transmission to the communication device via the two or more parent nodes. The method may further include receiving a congestion indication at the base station, wherein the congestion indication indicates that congestion happens at the communication device; and taking an action to reduce the congestion at the communication device in response to the congestion indication. In an embodiment of the present application, taking the action to reduce the congestion at the communication device may include deactivating at least one parent node of the two or more parent nodes such that downlink transmission is not transmitted from the at least one parent node to the communication device.

In an embodiment of the present application, receiving the congestion indication at the base station may include receiving the congestion indication from an upstream node of the communication device. In another embodiment of the present application, receiving the congestion indication at the base station may include receiving the congestion indication via a Radio Resource Control (RRC) signaling message from the communication device.

Yet another embodiment of the present disclosure provides an apparatus. According to some embodiments of the present disclosure, the apparatus includes: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions are configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Figure 1A:
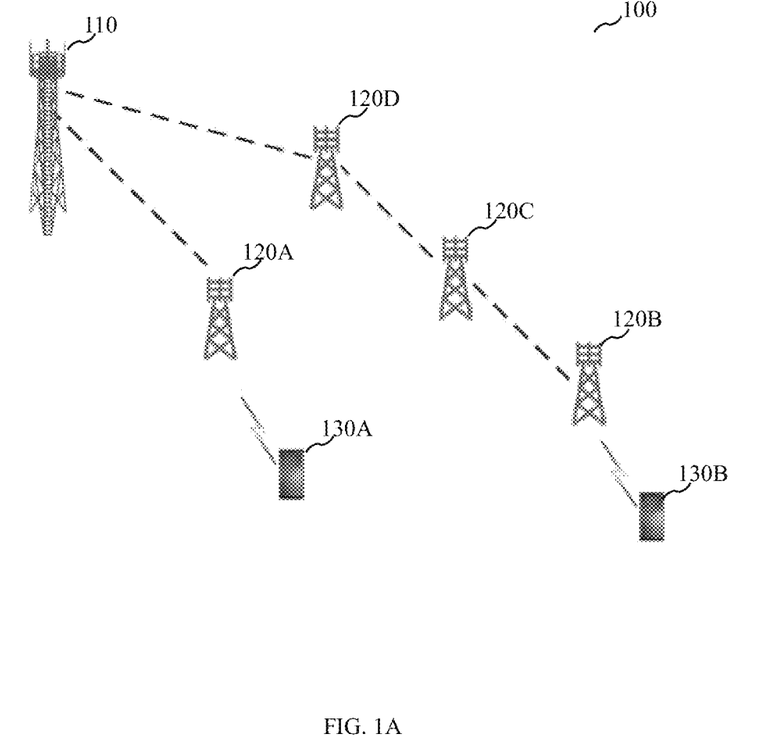
FIG. 1A illustrates a schematic wireless communication system according to some embodiments of the present disclosure.

FIG. 1A illustrates a wireless communication system 100 according to some embodiments of the present disclosure.

Referring to FIG. 1A, the wireless communication system 100 can include an IAB donor node (e.g., donor node 110), some IAB nodes (e.g., IAB node 120A, IAB node 120B, IAB node 120C, and IAB node 120D), and some UEs (e.g., UE 130A and UE 130B). Although merely, for simplicity, one donor node is illustrated in FIG. 1A, it is contemplated that the wireless communication system 100 may include more donor node(s) in some other embodiments of the present disclosure. Similarly, although merely four IAB nodes are illustrated in FIG. 1A for simplicity, it is contemplated that the wireless communication system 100 may include more or fewer IAB nodes in some other embodiments of the present disclosure. Although merely two UEs are illustrated in FIG. 1A for simplicity, it is contemplated that the wireless communication system 100 may include more or fewer UEs in some other embodiments of the present disclosure.

IAB node 120A is directly connected to donor node 110. IAB node 120D is directly connected to donor node 110. IAB node 120A can be connected to donor node(s) other than donor node 110 in accordance with some other embodiments of the present disclosure. IAB node 120D can be connected to donor node(s) other than donor node 110 in accordance with some other embodiments of the present disclosure.

IAB node 120C can reach donor node 110 via IAB node 120D. IAB node 120D is a parent node of IAB node 120C. In other words, IAB node 120C is a child node of IAB node 120D. IAB node 120B can reach donor node 110 via IAB node 120C and IAB node 120D. IAB node 120C and IAB node 120D are upstream nodes of IAB node 120B, and IAB node 120C is a parent node of IAB node 120B. In other words, IAB node 120B is a child node of IAB node 120C. IAB node 120B and IAB node 120C are downstream nodes of IAB node 120D. UE 130A is directly connected to IAB node 120A, and UE 130B is directly connected to IAB node 120B. In other words, UE 130A and UE 130B are served by IAB node 120A and IAB node 120B, respectively. In some other embodiments of the present disclosure, UE 130A and UE 130B may also be referred to as child nodes of IAB node 120A and IAB node 120B, respectively.

Each of IAB node 120A, IAB node 120B, IAB node 120C, and IAB node 120D may be directly connected to one or more UEs in accordance with some other embodiments of the present disclosure.

Each of IAB node 120A, IAB node 120B, IAB node 120C, and IAB node 120D may be directly connected to one or more IAB nodes in accordance with some other embodiments of the present disclosure.

In the wireless communication system 100, which provides multi-hop relay, a wireless backhaul link may fail due to, for example but is not limited to, blockage by moving object(s) (e.g., vehicle(s)), foliage (caused by seasonal changes), new building(s) (e.g., infrastructure changes). Such backhaul link failure may occur either on a physically stationary IAB node or a mobile IAB node. Link switching technique has been developed to address this issue.

For example, assuming that a Radio Link Failure (RLF) occurs on the backhaul link between donor node 110 and IAB node 120D, IAB node 120D may establish a link to another donor node (not shown). In other words, IAB node 120D may switch from the link between IAB node 120D and donor node 110 to a link between IAB node 120D and another donor node (not shown).

For example, assuming that an RLF occurs on the backhaul link between two IAB nodes (e.g., IAB node 120D and IAB node 120C), IAB node 120C may establish a link to another IAB node (e.g., IAB node 120A). In other words, IAB node 120C may switch from the link between IAB node 120C and IAB node 120D to a link between IAB node 120C and a candidate IAB node 120A.

Also, traffic variations may create uneven load distribution on wireless backhaul links leading to local link or node congestion.

Figure 1B:
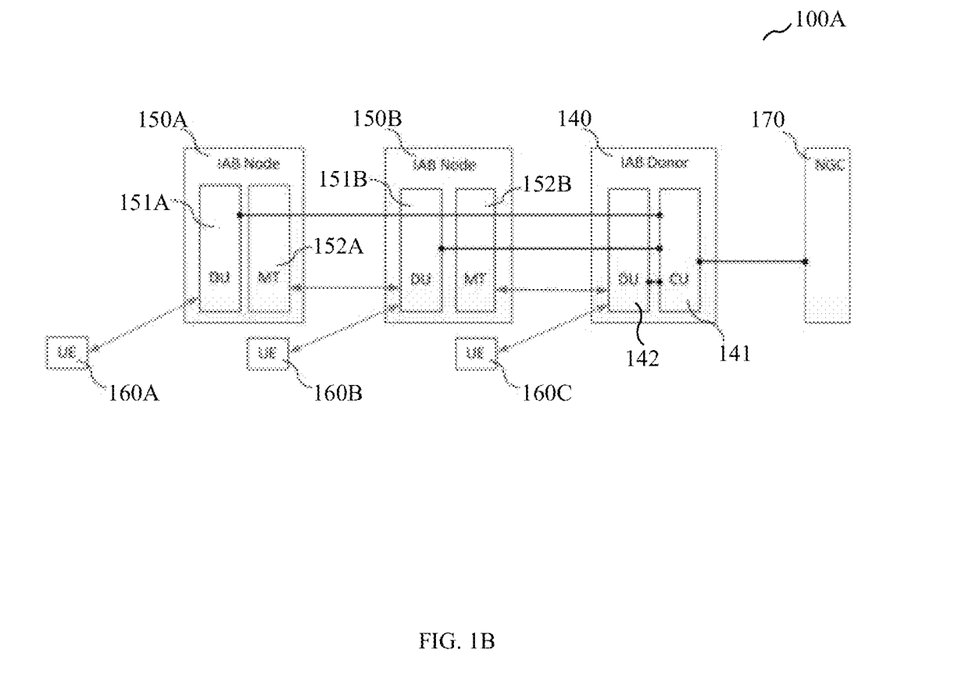
FIG. 1B illustrates a schematic wireless communication system according to some embodiments of the present disclosure.

FIG. 1B illustrates an exemplary wireless communication system 100A according to some embodiments of the present disclosure.

Referring to FIG. 1B, the wireless communication system 100A may include IAB donor 140, IAB node 150A, IAB node 150B, UE 160A, UE 160B, UE 160C and a Next-Generation Core (NGC) 170.

Each of the IAB node 150A and IAB node 150B may include a Distributed Unit (DU) and a Mobile Termination (MT). In the context of this disclosure, MT is referred to as a function resided in an IAB node that terminates the radio interface layers of the backhaul Uu interface toward an IAB donor or other IAB nodes. The IAB nodes may be connected to an upstream IAB node or a BS (e.g., an IAB donor) via the MT function. The IAB nodes may be connected to UEs and a downstream IAB node via the DU.

IAB node 150A may be connected to an upstream IAB node 150B via MT 152A function. IAB node 150A may be connected to UE 160A via the DU 151A. IAB node 150B may be connected to an upstream IAB node or IAB donor 140 via MT 152B function. IAB node 150B may be connected to UE 160B via DU 151B. IAB node 150B may be connected to downstream IAB node 150A via DU 151B.

In some embodiments of the present disclosure, the IAB nodes 150A and 150B in FIG. 1B may be Layer-2 (L2) IAB nodes. For example, each of the IAB node 150A and IAB node 150B may host a Backhaul Adaptation Protocol (BAP) layer, a Radio Link Control (RLC) layer, a Medium Access Control (MAC) layer, and a Physical layer (PHY). In some embodiments of the present disclosure, BAP layer in the MT of an IAB node may support pre-processing. BAP layer may submit BAP Data Protocol Data Units (PDUs) to RLC layer before UL grant is received. In other words, BAP layer may submit packets to a lower layer before the packets are requested by the lower layer. Referring back to FIG. 1A, the IAB nodes 120A, 120B, 120C, and 120D in FIG. 1A may be Layer-2 (L2) IAB nodes.

Referring to FIG. 1B, the BS (e.g., IAB donor 140) may include at least one DU to support UEs and MTs of downstream IAB nodes. One DU of a BS can support at least one cell. One cell can be supported by only one DU of a BS or one DU of an IAB node.

A Central Unit (CU) 141 included in the IAB donor 140 controls the DUs of all IAB nodes (e.g., IAB node 150A and IAB node 150B) and the DU(s) (e.g., DU 142) resided in the IAB donor 140. The DU(s) and the CU of an IAB donor may be co-located or may be located in different positions. The DU(s) and the CU of the IAB donor are connected via F1 interface. In other words, the F1 interface provides means for interconnecting the CU and the DU(s) of an IAB donor. The F1 Application Protocol (F1AP) supports the functions of F1 interface by certain F1AP signaling procedures.

In some embodiments of the present disclosure, CU 141 of the IAB donor 140 may host Radio Resource Control (RRC), Service Data Adaptation Protocol (SDAP) and Packet Data Convergence Protocol (PDCP) layers of the IAB donor 140. DU 142 of the IAB donor 140 may host Backhaul Adaptation Protocol (BAP) layer, Radio Link Control (RLC) layer, Medium Access Control (MAC) layer and Physical layer (PHY) of the IAB donor 140.

The wireless communication system 100A is in a standalone (SA) mode, in which each IAB node has only one parent node. In some other embodiments of the present disclosure, a wireless communication system may be in a non-standalone (NSA) mode, in which one or more IAB nodes may have more than one parent node.

Figure 2A:
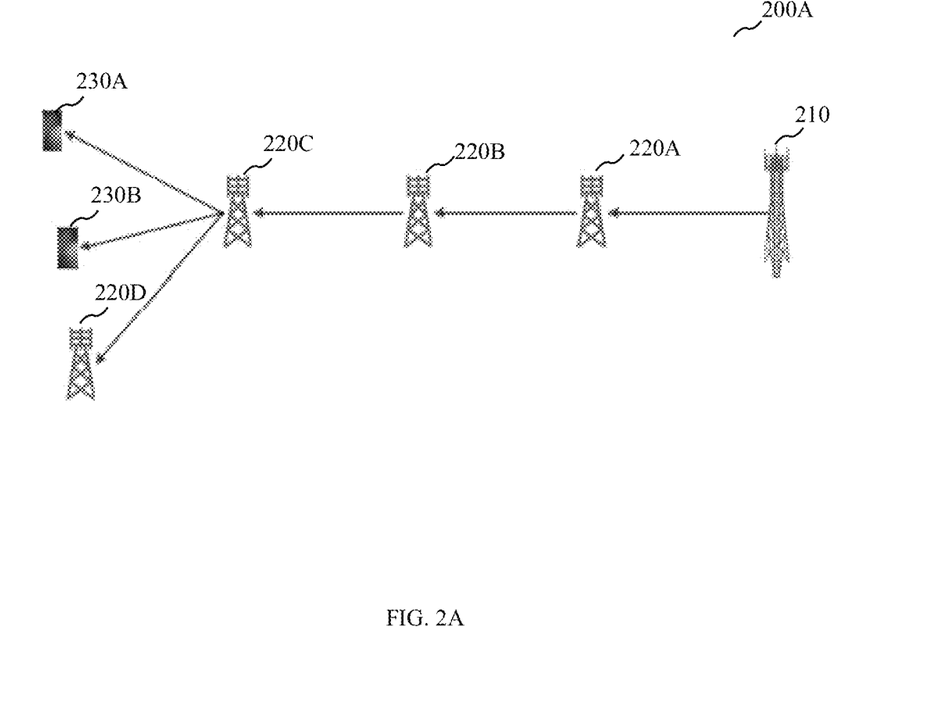
FIG. 2A illustrates a schematic wireless communication system according to some embodiments of the present disclosure.

FIG. 2A illustrates an exemplary wireless communication system 200A in an SA mode according to some embodiments of the present disclosure.

Referring to FIG. 2A, the wireless communication system 200A may include IAB Donor 210, IAB node 220A, IAB node 220B, IAB node 220C, IAB node 220D, UE 230A, and UE 230B. Although, for simplicity, FIG. 2A merely illustrates downlink communications from upstream nodes to downstream nodes (e.g., from IAB Donor 210 to IAB node 220A, from IAB node 220A to IAB node 220B, from IAB node 220B to IAB node 220C, and from IAB node 220C to UE 230A, to UE 230B, and to IAB node 220D), it is contemplated that uplink communications may exist in the opposite direction.

Similarly to the IAB nodes and IAB Donor in FIG. 1B, the IAB nodes in FIG. 2A (e.g., IAB node 220A, IAB node 220B, IAB node 220C, IAB node 220D) may include respective MTs and DUs (not illustrated in FIG. 2A), and the IAB Donor 210 may include at least one DU and a CU (not illustrated in FIG. 2A).

As illustrated in FIG. 2A, a UE (e.g., UE 230A or UE 230B) can access IAB Donor 210 via IAB nodes 220C, 220B, and 220A. On the downlink, the DU of an IAB node (e.g., IAB node 220B) may not know the downlink buffer status of its child node (e.g., IAB node 220C). Congestion may occur at any one of the IAB nodes 220C, 220B, and 220A. For example, assuming that the capacity of the link from IAB node 220C to UE 230A may be less than the capacity of the link from IAB node 220B to IAB node 220C, in this scenario, downlink data congestion can occur at IAB node 220C because the ingress data rate from IAB node 220B to IAB node 220C (which is scheduled by the DU of IAB node 220B) may be greater than the egress data rate from IAB node 220C to UE 230A (which can be scheduled by the DU of IAB node 220C for UE 230A). When congestion occurs at IAB node 220C, IAB node 220C may perform packet retransmission, or even may have to discard packet(s), which adversely affects service quality or performance of the wireless communication system 200A.

Similarly, if the capacity of the link from IAB node 220B to IAB node 220C is relatively less than the capacity of the link from IAB node 220A to IAB node 220B, congestion and packet discard may occur at IAB node 220B.

Various flow control techniques have been developed to address this issue. For example, an end-to-end flow control technique may help to address issues (e.g., packet discard) at the IAB node(s) due to downlink data congestion. In such solution, for example, the donor node (e.g., the CU of IAB Donor 210 in FIG. 2A) may take corresponding action(s) (e.g., reducing the data rate on the downlink) to alleviate downlink data congestion according to congestion report from the IAB node(s). However, end-to-end flow control may sometimes be unable to pinpoint the node which is suffering from congestion, and may be relatively slow to respond.

A hop-by-hop follow control technique can be used to relieve congestion. The hop-by-hop flow control technique may be employed separately or in combination with the end-to-end flow control technique for handling congestion at the IAB node(s). For example, an IAB node which is suffering from congestion (also referred to as "congested IAB node") may report relevant information to its parent node(s) (e.g., parent IAB node or donor node), which may perform flow control and alleviate downlink data congestion. The hop-by-hop flow control procedure will be described in detail in the following text.

Figure 2B:
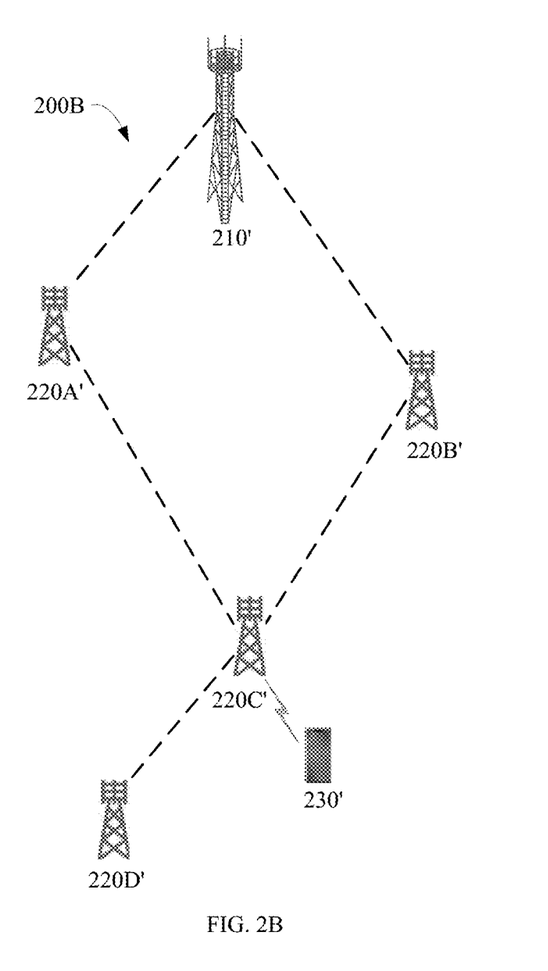
FIG. 2B illustrates a schematic wireless communication system according to some embodiments of the present disclosure.

FIG. 2B illustrates an exemplary wireless communication system 200B in a non-standalone (NSA) mode according to some embodiments of the present disclosure.

As shown in FIG. 2B, the wireless communication system 200B may include a donor node (e.g., IAB Donor 210'), some IAB nodes (e.g., IAB node 220A', IAB node 220B', IAB node 220C', and IAB node 220D'), and some UEs (e.g., UE 230'). It should be understood that wireless communication systems in an NSA mode according to some other embodiments of the present disclosure may have various structures other than the exemplary one shown in FIG. 2B.

Similarly to the IAB nodes and IAB Donor in FIG. 1B, the IAB nodes in FIG. 2B (e.g., IAB node 220A', IAB node 220B', IAB node 220C', and IAB node 220D') may include respective MTs and DUs (not illustrated in FIG. 2B), and the IAB Donor 210 may include at least one DU and a CU (not illustrated in FIG. 2B).

The above descriptions regarding the IAB Donor 210, IAB node 220A, IAB node 220B, IAB node 220C, and IAB node 220D and UE 230A in FIG. 2A can also be applied to the wireless communication system 200B in FIG. 2B except that in the wireless communication system 200B, multi-connectivity is configured for one or more IAB nodes (e.g., IAB node 220C'). Dual-connectivity may be considered a special instance of multi-connectivity. In some examples, IAB Donor 210' may configure that IAB node 220A' is a Master Node (MN) and IAB node 220B' is a Secondary Node (SN) at IAB node 220C'. For example, IAB Donor 210' may configure to IAB node 220C' that the Cell Group (CG) ID of IAB node 220A' is "0," which indicates that IAB node 220A' is a MN. IAB Donor 210' may configure to IAB node 220C' that the CG ID of IAB node 220B' is "1," which indicates that IAB node 220B' is a SN.

For example, as shown in FIG. 2B, the IAB node 220C' may be connected to more than one parent IAB nodes, including the IAB node 220A' and the IAB node 220B'. In other words, both the IAB node 220A' and the IAB node 220B' serve a same child IAB node, e.g., the IAB node 220C'. In this scenario, the IAB node 220C', would have a plurality of routes to the donor node, e.g., the IAB Donor 210', via a plurality of parent IAB nodes, e.g., the IAB node 220A' and the IAB node 220B'. For example, the IAB node 220C' can reach the IAB Donor 210' via the IAB node 220A' (route A: IAB Donor 210'<->IAB node 220A'<->IAB node 220C'). Alternatively, the IAB node 220C' can reach the IAB Donor 210' via the IAB node 220B' (route B: IAB Donor 210'<->IAB node 220B'<->IAB node 220C'). From the perspective of the downstream nodes of the IAB node 220C' (e.g., the IAB node 220D'), the IAB node 220D' also has plurality of routes to the IAB Donor 210' via the IAB node 220C'. Please note that multi-connectivity may also be configured for one or more other IAB nodes in the wireless communication system.

In some embodiments of the present disclosure, only one route of a plurality of routes from an IAB node to an IAB Donor may be active, and the remaining routes of the plurality of routes may be in a backup state. Data transmission and reception may not be allowed on a route in the backup state. For example, referring to FIG. 2B, at the IAB node 220C', route A (IAB Donor 210'<->IAB node 220A'<->IAB node 220C') may be active, but route B (IAB Donor 210'<->IAB node 220B'<->IAB node 220C') may be in a backup state. In other words, the IAB node 220C' may be connected to the IAB node 220B', but there may be no data communication (e.g. data transmission or receiving) on route B at that time.

In some embodiments of the present disclosure, two or more routes of a plurality of routes from an IAB node to an IAB Donor may be active. For example, referring to FIG. 2B, at IAB node 220C', both route A and route B may be active. In other words, IAB node 220C' may transmit or receive data on both route A and route B at the same or different times.

On the downlink, from an IAB node's perspective, the Radio Link Control (RLC) channel between the IAB node and a parent node of the IAB node is referred to as an ingress RLC channel, and the RLC channel between the IAB node and a child node of the given IAB node is referred to as an egress RLC channel. Each RLC channel may correspond to a logical channel may correspond to a RLC channel.

In some embodiments of the present disclosure, an IAB Donor may configure an association of ingress RLC channels with one or more parent nodes of an IAB node. In other words, downlink transmissions from the IAB Donor may be transmitted to the IAB node through the one or more parent nodes of the IAB node as configured by the IAB Donor.

For example, in some embodiments of the present disclosure, an IAB Donor may configure an IAB node in a manner that each of the ingress RLC channels of the IAB node is associated with one parent node (hereinafter, "associated parent node") of the IAB node. Such a configuration is hereinafter referred to as Multi-connectivity Scheme I. Under this scheme, local link selection is not supported at an IAB node. At an IAB node, one RLC entity and one Backhaul Adaptation Protocol (BAP) entity may be configured for each RLC channel. Under this scheme, each RLC entity at an IAB node is configured to be associated with one peer RLC entity at the associated parent node; and each BAP entity at an IAB node is configured to be associated with one peer BAP entity at the associated parent node.

For example, referring to FIG. 2B, IAB Donor 210' may configure that ingress RLC channel A (which may carry downlink transmission for voice communication) of IAB node 220C' is associated with one parent node (e.g., IAB node 220B') of IAB node 220C'. IAB Donor 210' may configure ingress RLC channel B (which may carry downlink transmission for streaming media communication) of IAB node 220C' is associated with a different parent node (e.g., IAB node 220A') or the same parent node (e.g., IAB node 220B'). In this way, IAB node 220C' may receive data of ingress RLC channel A via IAB node 220B', and may receive data of ingress RLC channel B via IAB node 220A' or IAB node 220B', as configured by IAB Donor 210'.

In some other embodiments of the present disclosure, an IAB Donor may configure an IAB node in a manner that each of the ingress RLC channels of the IAB node is associated with two or more parent nodes (hereinafter, "associated parent nodes") of the IAB node, and the IAB Donor may autonomously select one of the associated parent nodes for downlink transmission of an ingress RLC channel, based on certain criteria including, for example, channel qualities or loading of the associated patent nodes. The channel quality may be determined based on at least one or more of the following: Reference Signal Received Power (RSRP), Reference Signal Strength Indicator (RSSI), or Reference Signal Receiving Quality (RSRQ). Other channel quality metrics may also be employed. Such a configuration is hereinafter referred to as Multi-connectivity Scheme II.

Under this scheme, local link selection is supported at an IAB node. As mentioned above, at an IAB node, one RLC entity and one Backhaul Adaptation Protocol (BAP) entity may be configured for each RLC channel. Under this scheme, each RLC entity (or BAP entity) at an IAB node may be configured to be associated with two or more peer RLC entities (or BAP entities) at the two or more associated parent nodes.

For example, referring to FIG. 2B, IAB Donor 210' may configure that the ingress RLC channels (e.g., RLC channel A and RLC channel B) of IAB node 220C' are associated with both IAB node 220A' and IAB node 220B'. IAB Donor 210' may autonomously select either IAB node 220A' or IAB node 220B' for transmitting downlink transmissions carried by the ingress RLC channels of the IAB node 220C'.

In yet other embodiments of the present disclosure, an IAB Donor may configure an IAB node in a manner that each of the ingress RLC channels of the IAB node is associated with two or more parent nodes (hereinafter, "associated parent nodes") of the IAB node, and the IAB Donor may transmit downlink transmission to each associated parent node. Such a configuration is hereinafter referred to as Multi-connectivity Scheme III.

Under this scheme, duplicated links are supported at an IAB node. That is, the IAB Donor may transmit duplicated downlink data to the two or more associated parent nodes of an IAB node. The IAB node may receive the same data from the two or more associated parent nodes. The IAB node may only reserve one copy of the downlink data (e.g., the one received at the earliest time), and may discard other copies of the downlink data.

As mentioned above, at an IAB node, one RLC entity and one Backhaul Adaptation Protocol (BAP) entity may be configured for each RLC channel. Under this scheme, each RLC entity (or BAP entity) at an IAB node may be configured to be associated with two or more peer RLC entities (or BAP entities) at the two or more associated parent nodes. The IAB Donor may transmit duplicated data to the IAB node via the two or more associated parent nodes.

For example, referring to FIG. 2B, IAB Donor 210' may configure that the ingress RLC channels (e.g., RLC channel A and RLC channel B) of IAB node 220C' are associated with both IAB node 220A' and IAB node 220B'. IAB Donor 210' may transmit downlink transmissions carried by the RLC channels of IAB node 220C' to both IAB node 220A' and IAB node 220B'. In this way, reliability in downlink transmission may be improved.

The RLC channels between an IAB node and its parent IAB nodes may include at least one Backhaul (BH) ingress RLC channel.

As mentioned above with respect to the wireless communication system 200A in an SA mode (FIG. 2A), downlink data congestion may occur at an IAB node. In a wireless communication system in a NSA mode, downlink data congestion may similarly occur at an IAB node.

For example, referring to FIG. 2B, assuming that the IAB Donor 210' may transmit streaming media communication to UE 230' via IAB node 220B' and IAB node 220C', the capacity of the link from IAB node 220C' to UE 230' may be less than the capacity of the link from IAB node 220B' to IAB node 220C', in this scenario, downlink data congestion can occur at IAB node 220C' because the ingress data rate from IAB node 220B' to IAB node 220C' (which is scheduled by the DU of IAB node 220B') may be greater than the egress data rate from IAB node 220C' to UE 230' (which can be scheduled by the DU of IAB node 220C' for UE 230'). Similarly, congestion may occur at any one of the IAB nodes 220A', 220B', and 220D'. As mentioned above, the hop-by-hop flow control procedure may be employed to alleviate such congestion, and will be described in detail in the following text with respect to FIG. 3.

Figure 3:
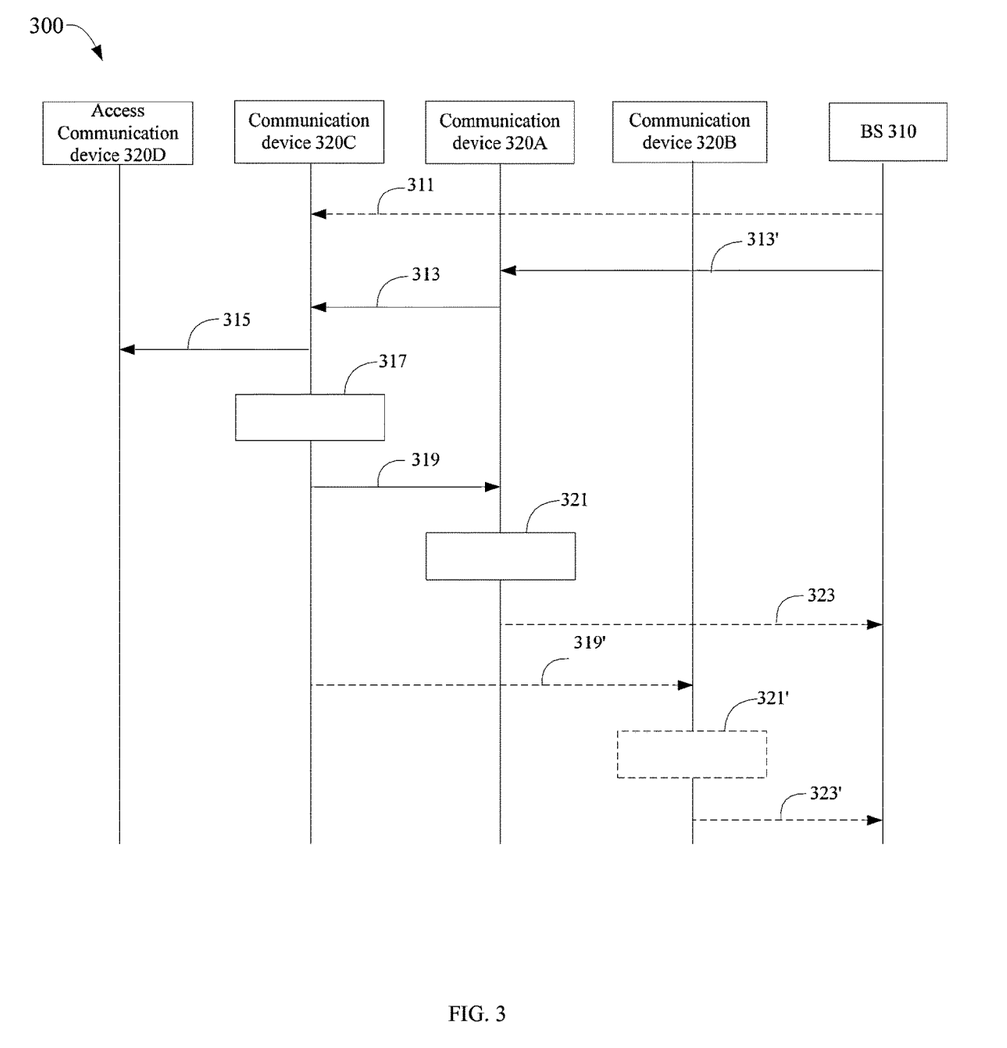
FIG. 3 illustrates a flow chart of an exemplary procedure of handling hop-by-hop flow control according to some embodiments of the present disclosure.

FIG. 3 illustrates a flow chart of an exemplary procedure 300 of handling hop-by-hop flow control according to some embodiments of the present disclosure.

In FIG. 3, multi-connectivity may be configured for a communication device (e.g., communication device 320C). For example, the communication device 320C can reach a BS 310 via a communication device 320A (route E: BS 310<-> communication device 320A<-> communication device 320C). The communication device 320C can also reach the BS 310 via the communication device 320B (route F: BS 310<-> communication device 320B <-> communication device 320C). In other words, both the communication device 320A and the communication device 320B serve a same child node, e.g., the communication device 320C. An access communication device 320D is a child node of the communication device 320C.

Although, for simplicity, the communication device 320C is configured with dual-connectivity in FIG. 3, the communication device 320C may be connected to more than two parent nodes in accordance with some embodiments of the present disclosure. Please note that multi-connectivity may also be configured for one or more other communication devices in FIG. 3.

In some examples, the communication device 320A may function as the IAB node 220A' shown in FIG. 2B, the communication device 320B may function as the IAB node 220B' shown in FIG. 2B, the communication device 320C may function as the IAB node 220C' shown in FIG. 2B, the access communication device 320D may function as the IAB node 220D' or the UE 230' shown in FIG. 2B, and the BS 310 may function as the IAB Donor 210' shown in FIG. 2B.

The communication devices in FIG. 3 (e.g., communication device 320A, communication device 320B, and communication device 320C) may include respective MTs and DUs (not illustrated in FIG. 3), and the BS 310 may include at least one DU and a CU (not illustrated in FIG. 3).

Although the communication device 320A and the communication device 320B are connected to the same BS, e.g. the BS 310, in FIG. 3, the communication device 320A and the communication device 320B may be connected to different BSs in accordance with some embodiments of the present disclosure.

Referring to FIG. 3, in some embodiments of the present disclosure, the procedure 300 may include operation 311 (denoted by dotted arrow as an option). In operation 311, the BS 310 may transmit configuration information indicating a threshold to configure the communication device 320C. The threshold may be used for congestion indication and may be associated with a data volume. For example, the threshold may be a data size (e.g., 800 bytes) or a percentage of a data volume (e.g., 80%).

In some embodiments of the present disclosure, the BS 310 may transmit the configuration information to a MT of the communication device 320C via a Radio Resource Control (RRC) signaling message. In some other embodiments of the present disclosure, the BS 310 may transmit the configuration information to a Distributed Unit (DU) of the communication device 320C via an F1 signaling message.

In some embodiments of the present disclosure, the configuration information may indicate the Cell Group (CG) ID of the parent nodes of the communication device 320C. For example, BS 310 may configure to communication device 320C that the CG ID of communication device 320A is "0" and the CG ID of communication device 320B is "1."

In some other embodiments of the present disclosure, the configuration information may be preconfigured or predetermined. The configuration information may include a threshold associated with a data volume, as described above. For example, the communication device 320C may determine the above-mentioned threshold by itself. In these embodiments, operation 311 may be eliminated.

In operations 313', 313, and 315, the BS 310 may transmit downlink transmissions to access communication device 320D via communication devices 320A and 320C. In some embodiments of the present disclosure, the BS 310 may transmit downlink transmissions to access communication device 320D via communication devices 320B and 320C (not shown in FIG. 3).

In operation 317, the communication device 320C may determine whether congestion happens at the communication device 320C based on the threshold. In operation 319, the communication device 320C may transmit a congestion indication to its parent node(s) (e.g., communication device 320A) via a Backhaul Adaptation Protocol (BAP) signaling message when it is determined that the congestion happens at the communication device 320C.

For example, in some embodiments of the present disclosure, the communication device 320C may receive downlink transmissions carried by an ingress RLC channel (e.g., ingress RLC channel A) between the communication device 320C and its parent node (e.g., communication device 320A) from the BS 310. The communication device 320C may determine buffer size information associated with the ingress RLC channel. For example, the communication device 320C may determine a data volume (e.g., data volume $DV_1$) of a Radio Link Control (RLC) entity associated with the ingress RLC channel and a data volume (e.g., data volume $DV_2$) of a BAP entity associated with the ingress RLC channel at the DU of the communication device 320C.

In some embodiments of the present disclosure, the communication device 320C may determine the data volume of a RLC entity based on a size of at least one of the following:
 RLC Service Data Units (SDUs) that do not included in a RLC data Protocol Data Unit (PDU);
 RLC SDU segments that do not included in a RLC data PDU;
 RLC data PDUs that are pending for initial transmission; and
 RLC data PDUs that are pending for retransmission (RLC Acknowledged Mode).

In some embodiments of the present disclosure, the communication device 320C may determine the data volume of a BAP entity based on a size of at least one of the following:
 BAP Service Data Units (SDUs) for which BAP Data Protocol Data Units (PDUs) have not been constructed;
 BAP Data PDUs that have not been submitted to a lower layer; and
 BAP Control PDUs that have not been submitted to a lower layer.

The communication device 320C may determine a sum of data volume DV and data volume $DV_2$. The communication device 320C may determine that congestion happens at the communication device 320C when it is determined that the sum of the data volumes is equal to or greater than the above-mentioned threshold. The communication device 320C may generate a BAP control element including a congestion indication for transmitting to its parent node(s) for flow control when congestion happens at the communication device 320C.

In some embodiments of the present disclosure, the DU of the communication device 320C may determine whether the congestion happens or not. In some embodiments of the present disclosure, the DU of the communication device 320C may inform the Mobile Termination (MT) of the communication device 320C the happening of the congestion when the DU of the communication device 320C determines that the congestion happens at the communication device 320C. In some embodiments of the present disclosure, the MT of the communication device 320C may generate a BAP control element including a congestion indication. The MT of the communication device 320C may transmit the BAP control element to the parent node(s) (e.g., communication device 320A) of the communication device 320C.

In some embodiments of the present disclosure, the BAP control element may include at least one of the following:
 desired buffer size;
 desired bit rate;
 actual buffer size associated with a concerned ingress RLC channel;
 channel ID of the concerned ingress RLC channel;
 logical channel ID of a logical channel corresponding to the concerned ingress RLC channel; and
 a flag indicating that the BAP control element includes BAP control information rather than data for service.

The actual buffer size may refer to the data volume of the RLC entity associated with the concerned RLC channel, the data volume of the BAP entity associated with the concerned RLC channel, or a combination thereof.

As mentioned above, multi-connectivity may be configured for the communication device 320C. In some embodiments of the present disclosure, the BS 310 may configure the communication device 320C with Multi-connectivity Scheme I. In other words, as explained above, the BS 310 may configure that each ingress RLC channel of the communication device 320C is associated with one parent node (hereinafter, "associated parent node") of the communication device 320C. The communication device 320C may receive such configuration information in, for example, operation 311.

With such configuration, when the communication device 320C determines that congestion happens at an ingress RLC channel of the communication device 320C (that is, the buffer size associated with the ingress RLC channel is equal to or greater than the above-mentioned threshold), the communication device 320C may transmit a congestion indication to the parent node associated with the ingress RLC channel, as configured by the BS 310.

For example, the BS 310 may configure that ingress RLC channel A of communication device 320C is associated with communication device 320A, and RLC channel B of communication device 320C is associated with communication device 320B. Accordingly to such configuration, data of RLC channel A may be transmitted to the communication device 320C via route E as mentioned above (i.e., through communication device 320A), and data of RLC channel B may be transmitted to the communication device 320C via route F as mentioned above (i.e., through communication device 320B).

With such configuration, when the communication device 320C determines, in operation 317, that congestion happens at ingress RLC channel A, the communication device 320C may transmit, in operation 319, a congestion indication to communication device 320A. When the communication device 320C determines, in operation 317, that congestion happens at ingress RLC channel B, the communication device 320C may transmit, in operation 319' (denoted by dotted arrow as an option), a congestion indication to communication device 320B. As mentioned above, the congestion indications may be transmitted via respective Backhaul Adaptation Protocol (BAP) signaling messages.

In some embodiments of the present disclosure, the BS 310 may configure the communication device 320C with Multi-connectivity Scheme II. In other words, as explained above, the BS 310 may configure that each ingress RLC channel of the communication device 320C is associated with two or more parent nodes (hereinafter, "associated parent nodes") of the communication device 320C. The BS may autonomously select one of the associated parent nodes for downlink transmission of data of an ingress RLC channel of the communication device 320C. The communication device 320C may receive such configuration information in, for example, operation 311. In some embodiments of the present disclosure, Multi-connectivity Scheme II may be applied to a communication device by default. In these embodiments, the configuration operation (e.g., operation 311) may be eliminated.

In some embodiments of the present disclosure, the BS 310 may configure the communication device 320C with Multi-connectivity Scheme III. In other words, as explained above, the BS 310 may configure that each ingress RLC channel of the communication device 320C is associated with two or more parent nodes (hereinafter, "associated parent nodes") of the communication device 320C. The BS may transmit downlink transmissions to each associated parent node. The communication device 320C may receive such configuration information in, for example, operation 311. In some embodiments of the present disclosure, Multi-connectivity Scheme III may be applied to a communication device by default. In these embodiments, the configuration operation (e.g., operation 311) may be eliminated.

In the case that the communication device 320C is configured with Multi-connectivity Scheme II or Multi-connectivity Scheme III, when the communication device 320C determines that congestion happens at an ingress RLC channel of the communication device 320C (that is, the buffer size associated with the ingress RLC channel is equal to or greater than the above-mentioned threshold), the communication device 320C may transmit the congestion indication(s) to the two or more parent nodes associated with the ingress RLC channel, as configured by the BS 310.

For example, the BS 310 may configure that ingress RLC channel A of communication device 320C is associated with both communication device 320A and communication device 320B. With such configuration, when the communication device 320C determines, in operation 317, that congestion happens at ingress RLC channel A, the communication device 320C may transmit, in operation 319, a congestion indication to communication device 320A, and may transmit, in operation 319', a congestion indication to communication device 320B. The congestion indication to communication device 320A may be the same or different from the congestion indication to communication device 320B. As mentioned above, the congestion indications may be transmitted via respective Backhaul Adaptation Protocol (BAP) signaling messages.

In operation 321, after receiving the congestion indication from the communication device 320C, the communication device 320A may try to resolve the congestion by, for example, transmitting data to the communication device 320C at a relatively lower data rate. For example, the communication device 320A may reduce the bit rate of the ingress RLC channel, which is undergoing congestion, as indicated in the congestion indication.

In some embodiments of the present disclosure, the procedure 300 may include operation 323 (denoted by dotted arrow as an option). In operation 323, the communication device 320A may transmit the received congestion indication to the BS 310. For example, the communication device 320A may transmit the received congestion indication to the BS 310 when the communication device 320A cannot solve the congestion at the communication device 320C. The BS 310 may take an action to reduce the congestion at the communication device 320C in response to the congestion indication. The action that may be taken by BS 310 to reduce the congestion will be described below.

In some embodiments of the present disclosure, as an alternative or supplementary of transmitting the congestion indication to a parent node, the communication device 320C may transmit the congestion indication to the BS 310 via a RRC signaling message (not shown in FIG. 3). The BS 310 may take an action to reduce the congestion at the communication device 320C in response to the congestion indication. For example, when the parent node(s) of the communication device 320C cannot solve the congestion at the communication device 320C, the communication device 320C may transmit the congestion indication to the BS 310 via a RRC signaling message (not shown in FIG. 3).

In some embodiments of the present disclosure, the action that may be taken by BS 310 to reduce the congestion at the communication device 320C may include that the BS 310 may transmit data to the communication device 320C at a relatively lower data rate. In some embodiments of the present disclosure, the communication device 320C may be configured with Multi-connectivity Scheme III. That is, each ingress RLC channel of the communication device 320C is associated with two or more parent nodes of the communication device 320C. When the congestion indication indicates that congestion occurs on an ingress RLC channel of the communication device 320C (that is, the ingress RLC channel is undergoing congestion), the BS 310 may deactivate at least one parent node of the two or more parent nodes associated with the ingress RLC channel, such that downlink transmission is not transmitted from the at least one deactivated parent node to the communication device 320C.

Similarly, when the communication device 320B receives the congestion indication from the communication device 320C, the communication device 320B may perform similar operations as described above with respect to communication device 320A. For example, the communication device 320B may, in operation 321' (denoted by dotted arrow as an option), try to resolve the congestion by, for example, transmitting data to the communication device 320C (which is undergoing congestion) at a relatively lower data rate. In some examples, the communication device 320B may, in operation 323' (denoted by dotted arrow as an option), transmit the received congestion indication to the BS 310 when the communication device 320B cannot solve the congestion at the communication device 320C.

Although the exemplary procedure 300 shows operations 311-323', it should be appreciated by persons skilled in the art that some of the operations 311-323' may be eliminated, without departing from the spirit and scope of the disclosure.

Figure 4:
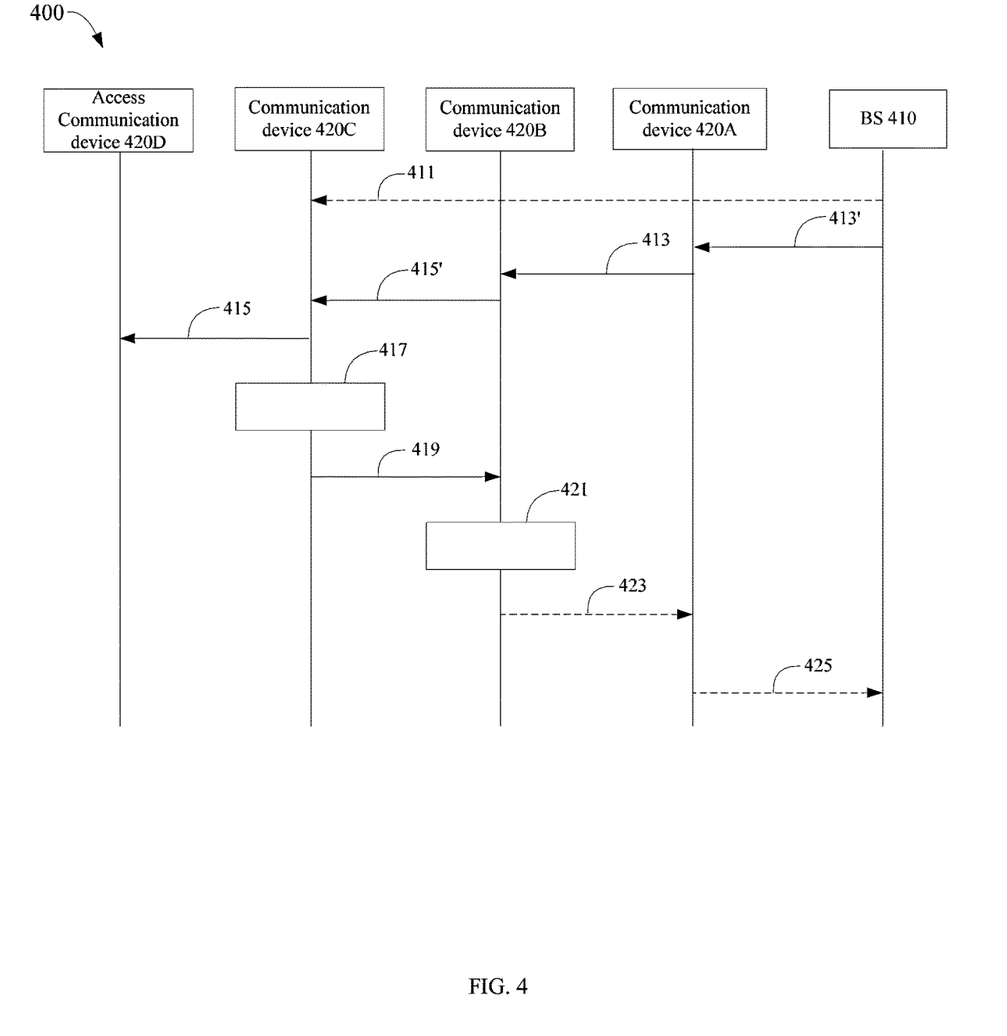
FIG. 4 illustrates a flow chart of an exemplary procedure of handling hop-by-hop flow control according to some embodiments of the present disclosure.

FIG. 4 illustrates a flow chart of an exemplary procedure 400 of handling hop-by-hop flow control according to some embodiments of the present disclosure. In FIG. 4, access communication device 420D can reach BS 410 via communication device 420C, communication device 420B, and communication device 420A.

In some examples, the communication device 420A may function as the IAB node 220A shown in FIG. 2A, the communication device 420B may function as the IAB node 220B shown in FIG. 2A, the communication device 420C may function as the IAB node 220C shown in FIG. 2A, the access communication device 420D may function as the IAB node 220D, the UE 230A or the UE 230B shown in FIG. 2A, and the BS 410 may function as the IAB Donor 210 shown in FIG. 2A.

In FIG. 4, the communication devices 420A, 420B, and 420C, the access communication device 420D and the BS 410 may perform similar operations as described above with respect to FIG. 3 except that each of the communication devices 420A, 420B, and 420C, and the access communication device 420D in FIG. 4 has only one parent node.

Referring to FIG. 4, in some embodiments of the present disclosure, the procedure 400 may include operation 411 (denoted by dotted arrow as an option). In operation 411, the BS 410 may transmit configuration information as described above with respect to operation 311 in FIG. 3 to communication device 420C. In operations 413', 413, 415', and 415, the BS 410 may transmit downlink transmissions to access communication device 420D via communication devices 420A, 420B, and 420C.

In operation 417, the communication device 420C may determine whether congestion happens at the communication device 420C in a similar manner as described above with respect to operation 317 in FIG. 3. In operation 419, the communication device 420C may transmit a congestion indication to its parent node (e.g., communication device 420B) via a BAP signaling message when it is determined that the congestion happens at the communication device 420C. The process of generating such BAP signaling message is similar to the one described above with respect to operation 319 in FIG. 3. For example, MT of the communication device 420C may generate and transmit a BAP control element to the communication device 420B. In operation 421, the communication device 420B may try to resolve the congestion at the communication device 420C in a similar manner as described above with respect to operation 321 in FIG. 3.

In some embodiments of the present disclosure, the procedure 400 may include operations 423 and 425 (denoted by dotted arrow as an option), which functions similarly as operation 323 in FIG. 3. For example, in operations 423 and 425, the communication device 420B may transmit the received congestion indication to its parent node (e.g., communication device 420A) which may transmit the same to the BS 410. The BS 410 may take an action to reduce the congestion at the communication device 420C in response to the congestion indication. The action that may be taken by BS 410 to reduce the congestion is similar to those described above with respect to FIG. 3.

In some embodiments of the present disclosure, as an alternative or supplementary of transmitting the congestion indication to a parent node, the communication device 420C may transmit the congestion indication to the BS 410 via a RRC signaling message (not shown in FIG. 4).

Although the exemplary procedure 400 shows operations 411-425, it should be appreciated by persons skilled in the art that some of the operations 411-425 may be eliminated, without departing from the spirit and scope of the disclosure.

Figure 5:
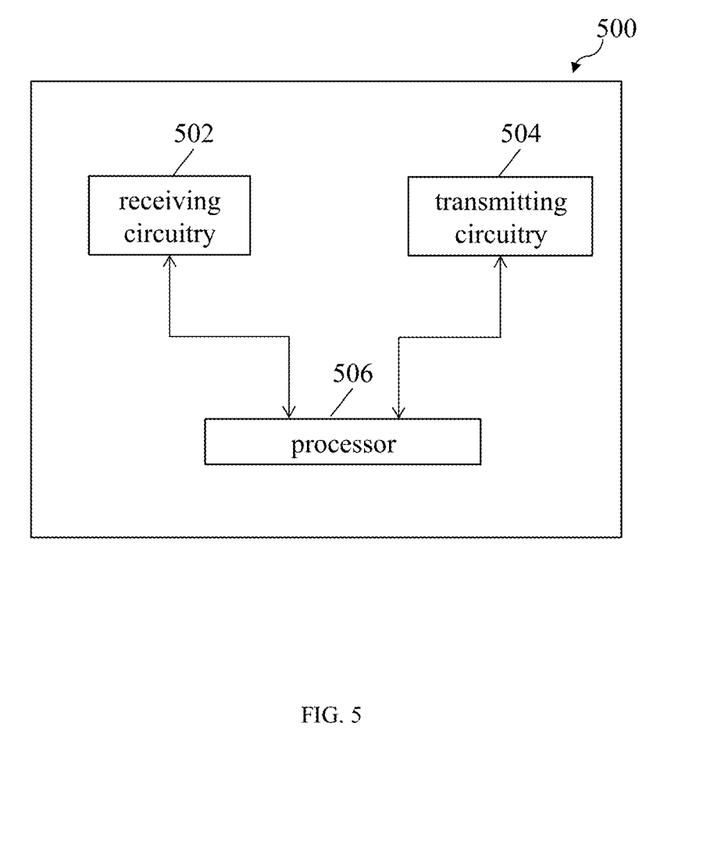
FIG. 5 illustrates an example block diagram of an apparatus according to some embodiments of the present disclosure.

FIG. 5 illustrates an example block diagram of an apparatus 500 according to some embodiments of the present disclosure.

As shown in FIG. 5, the apparatus 500 may include at least one non-transitory computer-readable medium (not illustrated in FIG. 5), a receiving circuitry 502, a transmitting circuitry 504, and a processor 506 coupled to the non-transitory computer-readable medium (not illustrated in FIG. 5), the receiving circuitry 502 and the transmitting circuitry 504. The apparatus 500 may be a BS or a communication device (e.g., an IAB node or a UE).

Although in this figure, elements such as processor 506, transmitting circuitry 504, and receiving circuitry 502 are described in the singular, the plural is contemplated unless limitation to the singular is explicitly stated. In some embodiments of the present disclosure, the receiving circuitry 502 and the transmitting circuitry 504 are combined into a single device, such as a transceiver. In certain embodiments of the present disclosure, the apparatus 500 may further include an input device, a memory, and/or other components.

In some embodiments of the present disclosure, the non-transitory computer-readable medium may have stored thereon computer-executable instructions to cause a processor to implement the method with respect to the communication device as described above. For example, the computer-executable instructions, when executed, cause the processor 506 interacting with receiving circuitry 502 and transmitting circuitry 504, so as to perform the steps with respect to the IAB nodes and UEs depicted in FIGS. 1A, 1B, 2A and 2B, and the access communication devices and the communication devices depicted in FIGS. 3 and 4.

In some embodiments of the present disclosure, the non-transitory computer-readable medium may have stored thereon computer-executable instructions to cause a processor to implement the method with respect to the BS as described above. For example, the computer-executable instructions, when executed, cause the processor 506 interacting with receiving circuitry 502 and transmitting circuitry 504, so as to perform the steps with respect to the IAB donors depicted in FIGS. 1A, 1B, 2A and 2B and the BSs depicted in FIGS. 3 and 4.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a device, the method comprising:
    receiving, from a base station, configuration information indicating a threshold associated with a data volume at the device;
    determining whether a sum of a first data volume of a radio link control (RLC) entity associated with an ingress RLC channel between a parent node and the device and a second data volume of a backhaul adaptation protocol (BAP) entity associated with the ingress RLC channel at a distributed unit of the device satisfies the threshold; and
    transmitting a congestion indication to the parent node via a BAP signaling message based at least in part on the sum satisfying the threshold.

2. The method of claim 1, wherein the configuration information is received at a mobile termination of the device via a radio resource control (RRC) signaling message.

3. The method of claim 1, wherein the configuration information is received at the distributed unit via an F1 signaling message.

4. The method of claim 1, wherein to satisfy the threshold, the sum of the first data volume and the second data volume is equal to or greater than the threshold.

5. The method of claim 4, wherein the first data volume is based at least in part on a size of at least one of:
    RLC service data units (SDUs) not included in an RLC data protocol data unit (PDU);
    RLC SDU segments not included in the RLC data PDU;
    RLC data PDUs that are pending for initial transmission; or
    RLC data PDUs that are pending for retransmission.

6. The method of claim 4, wherein the second data volume is based at least in part on a size of at least one of:
    BAP service data units (SDUs) for which BAP protocol data units (PDUs) have not been constructed;
    BAP data PDUs that have not been submitted to a lower layer; or
    BAP control PDUs that have not been submitted to the lower layer.

7. The method of claim 1, wherein the distributed unit determines whether the sum of the first data volume and the second data volume satisfies the threshold.

8. A device for wireless communication, comprising:
    at least one memory; and
    at least one processor coupled with the at least one memory and configured to cause the device to:
        receive, from a base station, configuration information indicating a threshold associated with a data volume at the device;
        determine whether a sum of a first data volume of a radio link control (RLC) entity associated with an ingress RLC channel between a parent node and the device and a second data volume of a backhaul adaptation protocol (BAP) entity associated with the ingress RLC channel at a distributed unit of the device satisfies the threshold; and
        transmit a congestion indication to the parent node via a BAP signaling message based at least in part on the sum satisfying the threshold.

9. The device of claim 8, wherein the at least one processor is further configured to cause the device to receive the configuration information at a mobile termination of the device via a radio resource control (RRC) signaling message.

10. The device of claim 8, wherein the at least one processor is further configured to cause the device to receive the configuration information at the distributed unit via an F1 signaling message.

11. The device of claim 8, wherein, to satisfy the threshold, the sum of the first data volume and the second data volume is equal to or greater than the threshold.

12. The device of claim 11, wherein the first data volume is based at least in part on a size of at least one of:
    RLC service data units (SDUs) not included in an RLC data protocol data unit (PDU);
    RLC SDU segments not included in the RLC data PDU;
    RLC data PDUs that are pending for initial transmission; or
    RLC data PDUs that are pending for retransmission.

13. The device of claim 11, wherein the second data volume is based at least in part on a size of at least one of:
BAP service data units (SDUs) for which BAP protocol data units (PDUs) have not been constructed;
BAP data PDUs that have not been submitted to a lower layer; or
BAP control PDUs that have not been submitted to the lower layer.

14. The device of claim 8, wherein the distributed unit determines whether the sum of the first data volume and the second data volume satisfies the threshold.

15. A base station for wireless communication, comprising:
at least one memory; and
at least one processor coupled with the at least one memory and configured to cause the base station to:
transmit, to a device, configuration information indicating a threshold associated with a data volume, wherein a congestion indication associated with the device is based at least in part on a sum of a first data volume of a radio link control (RLC) entity associated with an ingress RLC channel between a parent node and the device and a second data volume of a backhaul adaptation protocol (BAP) entity associated with the ingress RLC channel at a distributed unit of the device satisfying the threshold.

16. The base station of claim 15, wherein to transmit the configuration information, the at least one processor is configured to cause the base station to transmit the configuration information to one of:
a mobile termination of the device via a radio resource control (RRC) signaling message; or
the distributed unit via an F1 signaling message.

17. The base station of claim 15, wherein the at least one processor is further configured to cause the base station to:
transmit, to the device, additional configuration information indicating association of ingress RLC channels between the device and a plurality of parent nodes of the device, wherein each ingress RLC channel is associated with two or more parent nodes of the plurality of parent nodes; and
transmit a duplicated downlink transmission to the device via the two or more parent nodes.

18. The base station of claim 15, wherein the at least one processor is further configured to cause the device to:
receive the congestion indication, wherein the congestion indication indicates that congestion occurs at the device; and
perform an action to reduce the congestion at the device in response to the congestion indication.

19. A processor for wireless communication, comprising:
at least one controller coupled with at least one memory and configured to cause the processor to:
receive configuration information indicating a threshold associated with a data volume;
determining whether a sum of a first data volume of a radio link control (RLC) entity associated with an ingress RLC channel between a parent node and a device associated with the processor and a second data volume of a backhaul adaptation protocol (BAP) entity associated with the ingress RLC channel at a distributed unit of the device satisfies the threshold; and
transmitting a congestion indication to the parent node via a BAP signaling message based at least in part on the sum satisfying the threshold.

20. The processor of claim 19, wherein the configuration information is received at a mobile termination of the device via a radio resource control (RRC) signaling message.

* * * * *